United States Patent [19]

Burton et al.

[11] Patent Number: 4,944,114
[45] Date of Patent: Jul. 31, 1990

[54] FISH ATTRACTOR AND BUG KILLER

[76] Inventors: Charlie E. Burton, 3423 Colgate, Tyler, Tex. 75701; James H. McKay, Rt. 2, Box 19, Flint, Tex. 75762

[21] Appl. No.: 302,824
[22] Filed: Jan. 27, 1989
[51] Int. Cl.⁵ .......................... A01M 1/04; A01K 5/00
[52] U.S. Cl. .................................................. 43/113
[58] Field of Search ............................ 43/113; 119/51

[56] References Cited

U.S. PATENT DOCUMENTS

| 3,939,802 | 2/1976 | Neff | 43/113 |
| 4,251,945 | 2/1981 | Tasma | 43/113 |
| 4,282,673 | 8/1981 | Focks et al. | 43/113 |
| 4,356,656 | 11/1982 | Tasma | 43/113 |
| 4,438,585 | 3/1984 | Slatton | 43/113 |
| 4,519,160 | 5/1985 | McBrayer | 43/113 |

Primary Examiner—M. Jordan

[57] ABSTRACT

A device for attracting fish and flying insects, having a dome cover with two or more nylon cords inserted through holes in the bottom of the shaft, they rotate horizontally, these hit the insects, knocking them to the surface of the water.

1 Claim, 1 Drawing Sheet

FISH ATTRACTOR AND BUG KILLER

BACKGROUND OF THIS INVENTION

1. This invention relates to the attraction of fish and flying insects, which will eventually feed fish by killing or wounding insects and depositing them on the surface of the water. 2. The prior art which is closest to our invention is Slatton Pat. No. 4,438,585 dated Mar. 27, 1984 and is only an insect exterminator, if the insect happens to be close enough to be attracted by the smell of the bait placed inside. Other prior arts are:
Tasma 4,251,945 Dated Feb. 24, 1981
Neff 3,939,802 Dated Feb. 24, 1976
Focks and Hock 4,282,673 Dated Aug. 11, 1981

SUMMARY OF INVENTION

This is an invention to attract fish and flying insects by hanging the device over the surface of the water from a boat or fishing pier. By the use of an electric light and the reflection of same on the surface of the water, it attracts insects. It has two or more flexible cords of 0.065 gauge, attached to the shaft of a small motor, the shaft is positioned so the cords rotate horizontally at about 3500 RPM, just below the bottom edge of the plastic dome, so when the insect is struck by the cord it will not be thrown into the sides of the dome, but will fall on the surface of the water. The fish which have been attracted by the light and reflection on water are then in a mad rush to feed on or near the surface of the water.

The real object of this invention is to attract fish into a small area so they may be caught by the fisherman.

DESCRIPTION OF PREFERRED EMBODIMENT

Figure 1:
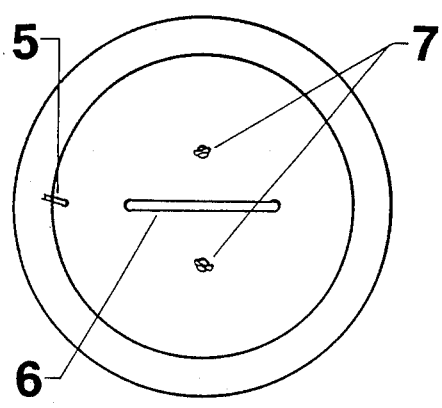
FIG. 1 is a top view of the invention.
Figure 2:
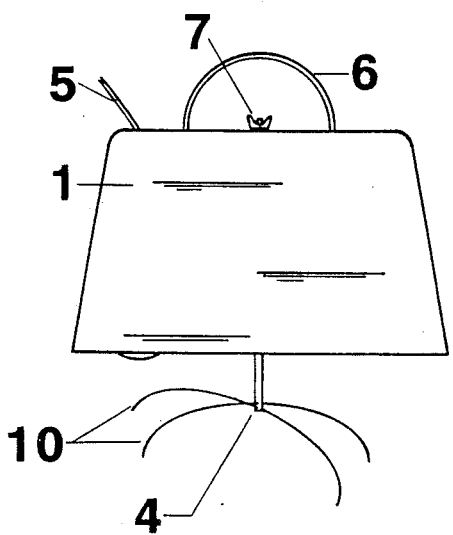
FIG. 2 is a side view of the invention
Figure 3:
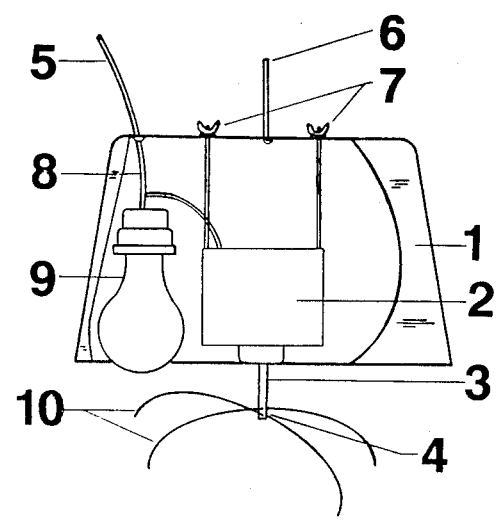
FIG. 3 is a cut out side view of the machine in accordance with the invention.

This device is in accordance with the invention which includes a container 1 which is a dome shaped object made of plastic, it is durable and economical. 2 is an electric motor which will turn up some 1500 to 3500 RPM, this will be either an AC 120 volt or a DC 12 volt. 3 is a motor shaft that extends below the bottom of the dome approximately $\frac{3}{4}$ to $1\frac{1}{4}$ inch. 4 is two or more small holes of approximately $\frac{1}{8}$ inch in diameter. The bottom hole will be within $\frac{1}{8}$ inch of the bottom of the motor shaft at a right angle to the one below or as they may be needed. 5 is an electric cord with a female plug which will be plugged into the power source. 6 is a hanger secured to the top of dome through small holes. 7 is the motor mounting bolts and nuts connected to top of dome. 8 is an electric cord inside the dome and is connected to the bulb socket as well as to the motor. 9 is an electric socket and light bulb. 10 is two or more strands of flexible nylon or similar cord which are approximately $\frac{1}{8}$ inch shorter than the diameter of the dome. These cords are about 0.065 in diameter and are inserted through the holes in the shaft and these are rotated horizontally at about 3500 RPM. The cords are below the bottom of the dome, thus they scatter the insects on top of the water and not on the inside of the dome.

We claim:
1. A fish feeding device comprised of a plastic dome having a closed top and open bottom, the closed top having a hanger for suspension, the open bottom containing a light source and an electric motor with a shaft having a flexible cord attached, the flexible cord extending past the light source for scattering insect parts over the water for feeding fish.

* * * * *